US012711027B2

(12) United States Patent
Kumar et al.

(10) Patent No.: US 12,711,027 B2
(45) Date of Patent: Aug. 18, 2026

(54) SYSTEM AND METHOD OF DYNAMIC HARDWARE RECONFIGURATION DURING FAILURE OF DEVICE IN A LOCK-STEP CONFIGURATION TO IMPROVE AVAILABILITY

(71) Applicant: NXP B.V., Eindhoven (NL)

(72) Inventors: Ashish Kumar, Bangalore (IN); Arjun Muddaiah, Bangalore (IN)

(73) Assignee: NXP B.V., Eindhoven (NL)

( * ) Notice: Subject to any disclaimer, the term of this patent is extended or adjusted under 35 U.S.C. 154(b) by 67 days.

(21) Appl. No.: 18/823,013

(22) Filed: Sep. 3, 2024

(65) Prior Publication Data

US 2025/0103448 A1 Mar. 27, 2025

(30) Foreign Application Priority Data

Sep. 24, 2023 (IN) ............................ 202341064063

(51) Int. Cl.
*G06F 11/18* (2006.01)
*G06F 11/16* (2006.01)

(52) U.S. Cl.
CPC ........ *G06F 11/181* (2013.01); *G06F 11/1629* (2013.01)

(58) Field of Classification Search
CPC ........................... G06F 11/181; G06F 11/1629
See application file for complete search history.

(56) References Cited

U.S. PATENT DOCUMENTS

| | | | | |
|---|---|---|---|---|
| 6,065,135 | A | 5/2000 | Marshall et al. | |
| 9,891,917 | B2 | 2/2018 | Hastie et al. | |
| 11,221,901 | B2 | 1/2022 | Panesar et al. | |
| 2003/0074618 | A1 * | 4/2003 | Dorsey | G01R 31/3185 714/733 |
| 2004/0019771 | A1 * | 1/2004 | Quach | G06F 11/165 714/E11.061 |
| 2007/0011513 | A1 | 1/2007 | Biswas et al. | |
| 2018/0046557 | A1 * | 2/2018 | Nakano | G06F 11/20 |
| 2019/0171536 | A1 | 6/2019 | Refaeli et al. | |
| 2020/0192742 | A1 * | 6/2020 | Boettcher | G06F 11/0721 |

FOREIGN PATENT DOCUMENTS

| | | |
|---|---|---|
| CN | 1297909 | 1/2007 |

* cited by examiner

*Primary Examiner* — Ashish Thomas
*Assistant Examiner* — Bryan P Huang

(57) ABSTRACT

A hardware reconfiguration system for first and second devices is in a lock-step configuration using a comparator that provides a lock-step error indication. The system includes at least one register that stores a lock-step threshold. The system also includes a lock-step monitor configured to compare a count of occurrences of the lock-step error indication from the comparator with the lock-step threshold. When the lock-step threshold is reached, the lock-step monitor is configured to enter a repair state to determine which one of the first and second devices is operating correctly and reconfigure operation into a split-lock mode to resume operation using the one of the first and second devices that is operating correctly.

17 Claims, 3 Drawing Sheets

SYSTEM AND METHOD OF DYNAMIC HARDWARE RECONFIGURATION DURING FAILURE OF DEVICE IN A LOCK-STEP CONFIGURATION TO IMPROVE AVAILABILITY

CROSS-REFERENCE TO RELATED APPLICATIONS

This application claims the priority under 35 U.S.C. § 119 of India application No. 202341064063, filed on 24 Sep. 2023, the contents of which are incorporated by reference herein.

FIELD

The present invention relates in general to processing system availability, and more particularly to system and method of dynamic hardware reconfiguration during failure of a device in a lock-step configuration to improve availability.

DESCRIPTION OF THE RELATED ART

A pair of devices in a lock-step configuration perform identical operations to provide redundancy to improve reliability and to provide a high level of detection coverage in the event of failure. Examples of devices that may be provided in a lock-step configuration include processing cores, direct memory access (DMA) engines, and bus systems, among others. Applications operating according to specified safety protocols, such as an automotive application operating according to the automotive safety integrity level (ASIL), use a lock-step configuration as a recognized safety technique. A lock-step configuration may be used to secure functional-safety relevant processing against errors such as, for example, single-point related errors that might cause faulty execution of processing like central processing unit (CPU) core execution. In some conventional lock-step configurations, when a lock-stepped device failed due to either a permanent or a random hardware failure, a lock-step error related alarm was triggered which was treated as among those events at the highest level of severity.

Conventionally, in response to a lock-step error related alarm, the system would enter a fail-safe state. If the system allowed the lock-step configuration to be disabled and the associated processing cores to run independently in a split-lock mode, however, then the system software (or firmware) forced the overall system into a state in which device operations, including applications running on the pair of lock-stepped cores, were halted for system diagnosis. The entire system was reset and the system software, detecting that the reset was based on a lock-step alarm, reconfigured the devices into a split-lock mode for testing the devices. Lock-stepped processing cores, for example, were each directed by the software to execute a set of core test instructions. The interface between the core test instructions and the system software invoked multiple handshakes with a significant level of software overhead to determine test completion and to collect the test results, which consumed a considerable amount of time.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

The present disclosure describes a system and method of dynamic hardware reconfiguration during failure of a device in a lock-step configuration to improve availability of the system. The lock-step configuration at least includes a pair of lock-stepped devices and a comparator that compares the states of the lock-stepped devices. The hardware is configured to intercept a programmable number of lock-step errors and to dynamically enter a repair state. Before entering the repair state, the lock-step configuration may first be reset as a programmable intermediate step in an attempt to avoid the repair state. When in the repair state, lock-step operation is disabled, diagnostic test operations are executed and test results are captured, the faulty device is halted and system operation is resumed with the working device in the split-lock mode. The system application is notified of the reconfigured state for additional remedial action. Software intervention that would otherwise force a system reset and perform time-consuming diagnostic operations with sluggish handshake communications is avoided. For each lock-step error detection, the hardware automatically determines whether to ignore, to reset the lock-stepped configuration or to enter the repair state to identify and isolate the fault. A programmable lock-step threshold value is provided to ignore a limited number of lock-step errors and then to reset only the lock-step configuration to potentially resolve any transient faults before entering the repair state.

Figure 1:
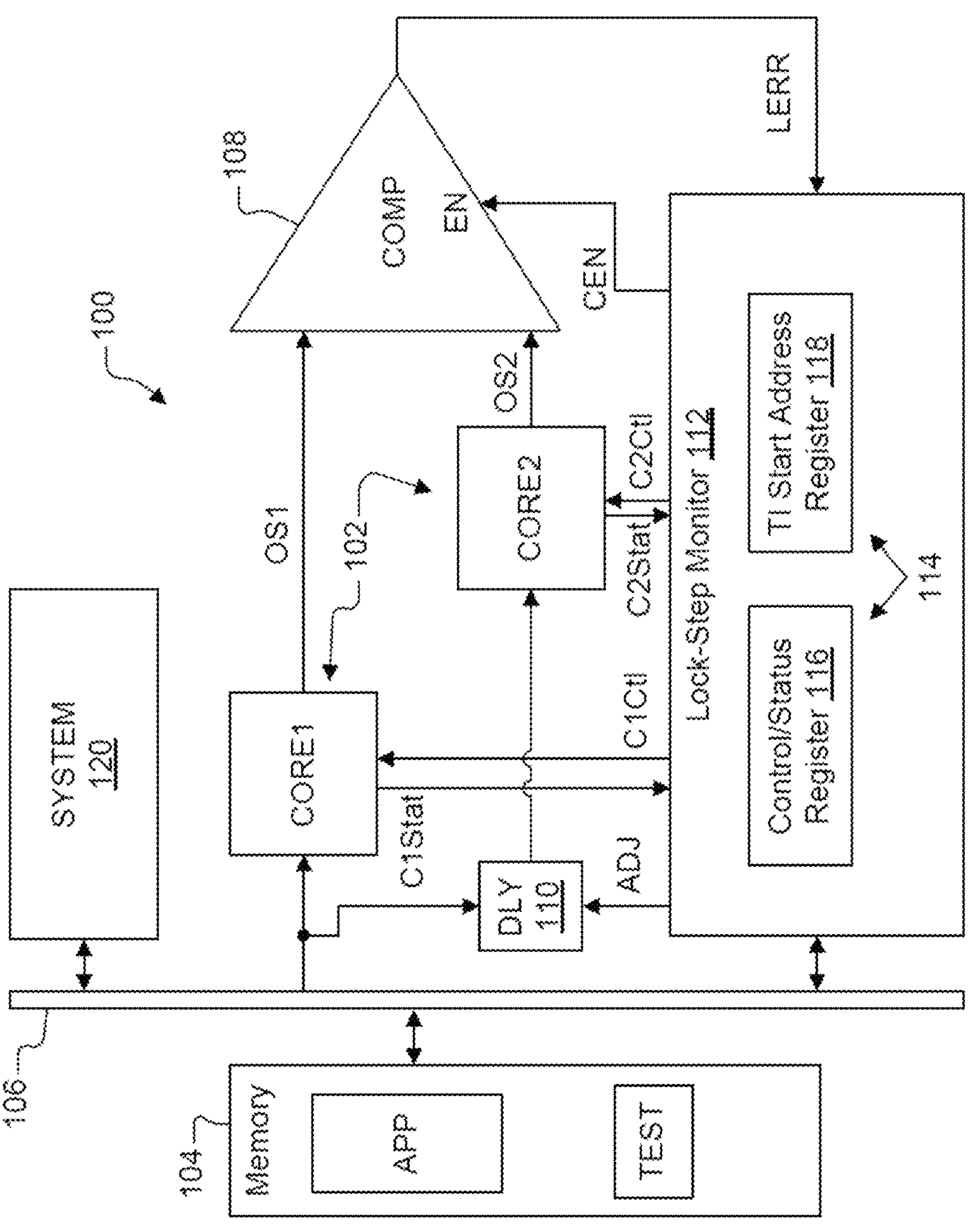
FIG. 1 is a simplified block diagram of a processing system including two processing cores implemented in a lock-step configuration along with hardware reconfiguration circuitry configured according to one embodiment.

FIG. 1 is a simplified block diagram of a processing system 100 including two processing cores 102 implemented in a lock-step configuration along with hardware reconfiguration circuitry configured according to one embodiment. The processing cores 102 include a first processing core CORE1 and a second processing core CORE2. In one embodiment, CORE1 operates as a primary processing core whereas CORE2 is provided as a monitoring processing core. The processing system 100 further includes a memory 104, a communication interface (I/F) 106, a comparator 108, delay circuitry 110, a lock-step monitor 112, and one or more registers 114. Each of the processing cores 102 may be implemented using any type of processing devices, such as microprocessors, central processing units (CPUs), microcontrollers (MCUs), etc. The memory 104 may configured as random-access memory (RAM) (which may be or may include portions that are persistent through reset) or as read-only memory (ROM) or any combination thereof. The memory 104 stores application (APP) instructions and TEST instructions configured for execution by the processing cores 102 as further described herein. The registers 114 may include a control and status (control/status) register 116 storing status information as further described herein and a register 118 storing a TEST instruction (TI) start address pointing to the TEST instructions stored within the memory 104. The registers 114 may be part of a separate register bank or may be included within the lock-step monitor 112 as shown.

The communication I/F 106 is configured in any suitable manner, such as a bus or switch circuitry or the like for enabling the processing cores 102 to access stored instructions or data. The communication I/F 106 may also be coupled to a SYSTEM 120 which represents the remaining portion of the overall system. The SYSTEM 120 may include processing devices that execute system software (or firmware) that generally performs additional functions of the application.

Upon power-up (POR) or any other reset (not initiated by the lock-step monitor 112), system software or user application can configure the control/status register 116 to first determine the reaction of the lock-step monitor 112 in the event of lock-step alarm. Then the processing cores 102 may each be configured to perform start-up routines and the like and to begin executing the APP instructions from the memory 104. The processing cores 102 may be substantially identical to each other and configured to operate at the same rate for executing the same instructions during successive clock cycles. The delay circuitry 110 inserts a lock-step delay of one or more clock cycles so that operation of CORE2 is delayed relative to CORE1. The lock-step delay is inserted as a fail-safe mechanism for temporal independence against common cause failures like random or asynchronous glitches caused by radiation or power or clock abnormalities that may impact operation of only one of the processing cores 102 at any given time. The first core CORE1 provides a first set of operating status signals OS1 to a first set of inputs of the comparator 108 and the second core CORE2 provides a second set of operating status signals OS2 to a second set of inputs of the comparator 108. CORE1 and CORE2 operate in a lock-step configuration such that OS2 is intended to be an identical albeit delayed version of OS1 as determined by the comparator 108. The comparator 108 asserts a lock-step error (LERR) signal to the lock-step monitor 112 when any comparison between OS1 and the delayed OS2 during any clock cycle is not equal indicating that lock-step operation has failed.

The lock-step monitor 112 receives the LERR signal for detecting any lock-step errors reported by the comparator 108. The lock-step monitor 112 selectively enables or disables the comparator 108 via a comparator enable (CEN) signal provided to an enable input of the comparator 108. The lock-step monitor 112 provides control signals C1Ctl for controlling operations of CORE1 and provides control signals C2Ctl for controlling operations of CORE2. Although the control signals C1Ctl and C2Ctl are shown coupled directly between each of the processing cores 102 and the lock-step monitor 112, such control may be via the communication I/F 106. The lock-step monitor 112 may use the control signals C1Ctl and C2Ctl, for example, for resetting the processing cores 102 and the comparator 108 and for directing each of the processing cores 102 to begin executing selected instructions. For example, the lock-step monitor 112 may direct either one or both the processing cores 102 to the TI start address to begin executing the TEST instructions stored in the memory 104. The TI start address may be programmed into the register 118 by a user or by the system software. When executing the TEST instructions, CORE1 reports test status information or results to the control/status register 116 via the C1Stat signals, and CORE2 reports test status information or results to the control/status register 116 via the C2Stat signals. The lock-step monitor 112 provides an adjust (ADJ) signal to the delay circuitry 110 for programming a lock-step delay duration, such as a number of clock signals or the like, or to disable the delay of the delay circuitry 110.

Figure 2:
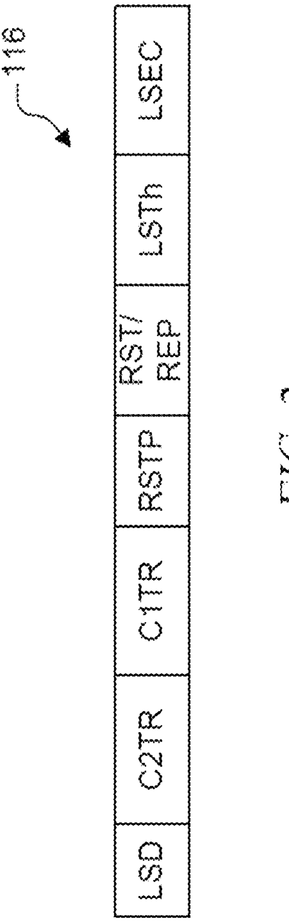
FIG. 2 is a simplified depiction of the stored values in the status register of FIG. 1 according to one embodiment.

FIG. 2 is a simplified depiction of the stored values in the control/status register 116 according to one embodiment. Each value stored in the control/status register 116 may include one or more bits of information depending upon the corresponding function. The control/status register 116 may store a lock-step error count (LSEC) value that provides a count of the number of times the LERR signal has been asserted. The LSEC value may be cleared by the system software or by the lock-step monitor 112. In one embodiment, the lock-step monitor 112 directly increments the LSEC value with each assertion of the LERR signal. In another embodiment, the lock-step monitor 112 may include a hardware counter or the like (not shown) for incrementing the LSEC value. The control/status register 116 may include a programmable lock-step threshold (LSTh) value. The LSTh may be programmed by a user via the system software for determining the number of lock-step errors that are ignored before taking further action as further described herein. A lock-step error may be caused, for example, by an asynchronous glitch or the like which may be automatically resolved by continued operation of the processing cores 102 without taking further corrective action. The LSEC and LSTh values each have a suitable number of bits for enabling flexibility for different applications or different operating conditions. In one embodiment, LSEC and LSTh values may each have at least 2-4 bits or more. The LSTh value may be programmed with a value of zero to directly perform lock-step configuration reset or to directly enter repair state in order to treat lock-step error with severity.

The control/status register 116 may include a programmable reset or repair (RST/REP) value which is a correction select value indicating whether or not to reset the lock-step configuration (at least including the processing cores 102 and the comparator 108) first before entering a repair state after the LSTh value has been reached or otherwise exceeded. The RST/REP value may be defined by a single bit that is programmed by a user via the system software. A lock-step configuration reset is an intermediate and less intrusive corrective step that may be performed before entering the repair state. The control/status register 116 may include a reset performed (RSTP) value, which may be a single bit, and which is programmed by the lock-step monitor 112 upon resetting the lock-step configuration. The control/status register 116 may include a C1 test result (C1TR) value programmed by CORE1 via the C1Stat signals indicative of test status or results while executing or after completion of the TEST instructions. The control/status register 116 may include a C2 test result (C2TR) value programmed by CORE2 via the C2Stat signals indicative of test status or results while executing or after completion of the TEST instructions. The C1TR and C2TR values may each be a single bit that identifies whether or not a fault of the corresponding core was detected. Alternatively, the C1TR and C2TR values may each include additional bits for providing additional diagnostic information in different configurations. The control/status register 116 may include a lock-step delay (LSD) value indicating the duration of the lock-step delay of the delay circuitry 110. The LSD value may include 1 or more bits (e.g., 2 bits) identifying a number of clock cycles of the lock-step delay. The LSD value may initially be programmed by the system software but may also be adjusted by the lock-step monitor 112.

In conventional lock-step configurations, a single lock-step error caused by either a permanent or a random hardware failure triggered a lock-step alarm which was treated with a high level of severity. The system software entered a safe state in which device operations (including, for example, any application instructions running on the processing cores 102) were halted for system diagnosis. Conventionally the software would halt the system in a fail-safe state or the entire system was reset and the system software, detecting that the reset was based on a lock-step alarm, reconfigured the lock-stepped device into a split-lock mode for performing diagnostic testing of each of the devices. In a lock-step core configuration, for example, the SYSTEM 120 directed both cores to independently execute a set of core test instructions. The system level reset was required resulting in a significant amount of software overhead due to multiple handshakes between system software (or system level firmware) to perform the tests and to determine the faulty device.

In contrast, the lock-step monitor 112 dynamically performs similar diagnostic functionality without requiring a system level reset or sluggish system software interference to ensure failsafe operation. The lock-step monitor 112 performs detection and automatic reconfiguration in hardware bypassing system level intervention of system software or the like to detect the fault and manually enable a split-lock mode as further described herein.

Figure 3:
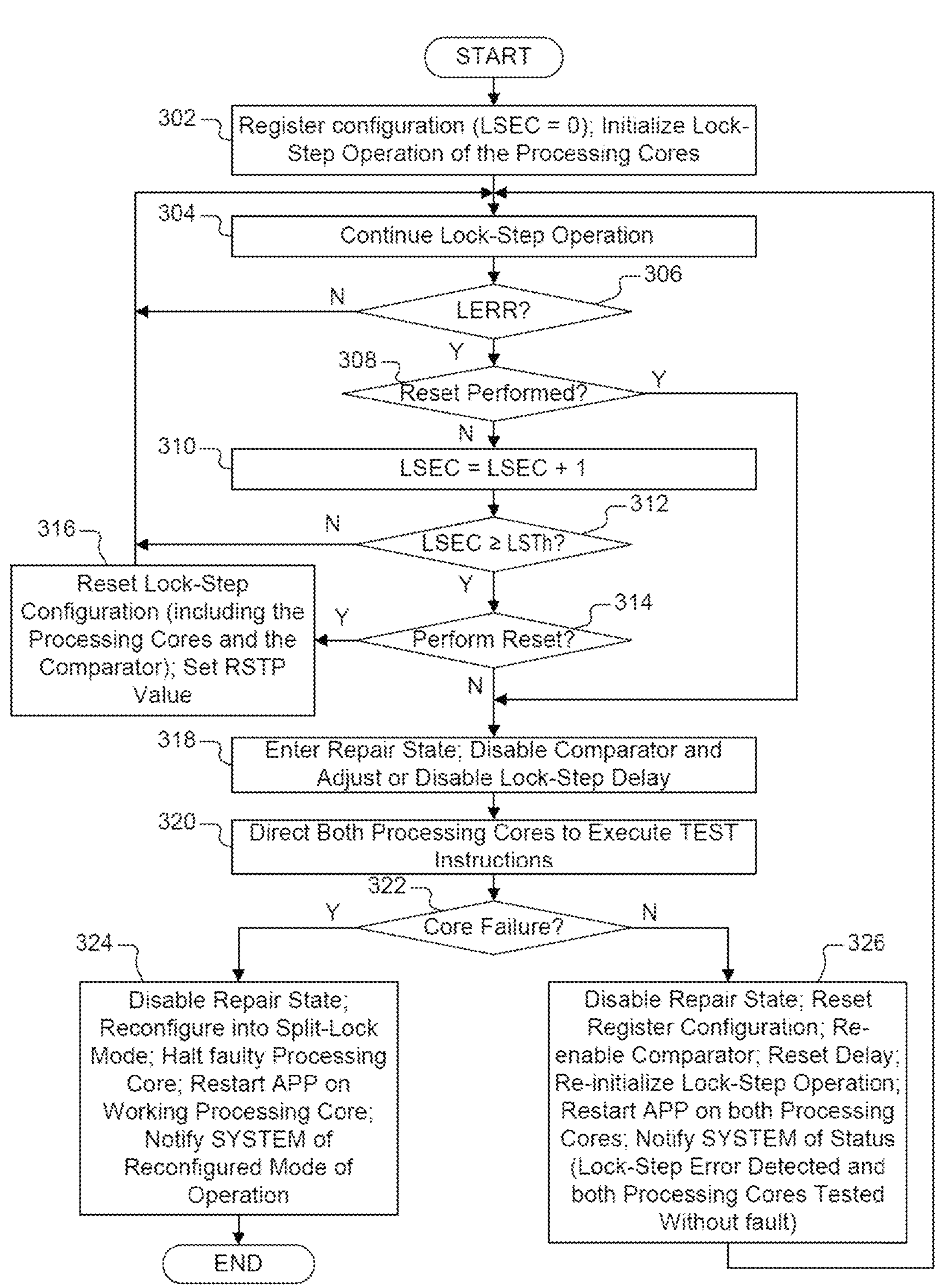
FIG. 3 is a flowchart diagram illustrating operation of the processing system of FIG. 1 in response to one or more lock-step errors according to one embodiment.

FIG. 3 is a flowchart diagram illustrating operation of the processing system 100 in response to one or more lock-step errors according to one embodiment. At an initial block 302 after POR or the like, the registers 114 are configured or otherwise initialized by either the SYSTEM 120 or the lock-step monitor 112 or a combination of both. The TI starting address is stored into the register 118. For the control/status register 116, the LSEC value may initially be cleared to 0, the LSTh value may be programmed with a maximum number of lock-step errors to be ignored, the RST/REP value may be programmed to determine whether lock-step configuration reset is to be performed or not, the RSTP, C1TR, and C2TR values may be initially cleared, and the LSD value may be programmed with the appropriate lock-step delay. Then the lock-step mode of operation of the processing cores 102 is initialized such as directing both cores to begin executing the APP instructions at the same time. Operation then advances to block 304 in which the lock-step mode of operation is continued until completion (subsequent power down or POR) or until a lock-step error is detected. As shown, for example, operation advances to block 306 to query whether the LERR signal has been asserted indicating occurrence of a lock-step error. Operation loops between blocks 304 and 306 during normal lock-step operation without lock-step errors.

If the LERR signal is asserted as determined at block 306, operation advances instead to block 308 to query whether a lock-step configuration reset has already been performed as indicated by the RSTP value in the control/status register 116. If the RSTP value is cleared or zero, then operation advances to block 310 to increment LSEC in response to assertion of the LERR signal. Operation then advances to block 312 to query whether LSEC is greater than or equal to LSTh (e.g., LSEC≥LSTh?). As previously described, a user may decide to ignore one or more lock-step errors before taking corrective action, in which case LSTh is programmed to be greater than 0. If LSEC is less than LSTh as determined at block 312, then operation loops back to block 304 to continue the lock-step mode of operation. If, however, LSEC is greater than or equal to LSTh including the case in which LSTh is programmed as 0, then operation advances to block 314 to query whether to reset the lock-step configuration as indicated by the RST/REP value. If the RST/REP value is 0 indicating that a reset is to be performed first, then operation advances to block 316 in which the lock-step monitor 112 resets both of the processing cores 102 and the comparator 108 (and possibly other lock-step configuration devices), and also sets the RSTP value in the control/status register 116 to record the fact that lock-step configuration reset has been performed. Operation then loops back to block 304 in which the lock-step mode of operation is continued after resetting the lock-step configuration.

If RSTP value has been previously set as determined at block 308 indicating that a reset has already been performed, or if the RST/REP value is 1 as determined at block 314 indicating that a reset is not to be performed, then operation advances instead to block 318 in which the lock-step monitor 112 causes the processing system 100 to enter the repair state. In the repair state, the lock-step monitor 112 clears the CEN signal to disable the comparator 108 and adjusts or otherwise disables the lock-step delay. The lock-step monitor 112 may adjust the lock-step delay directly via the ADJ signal or by clearing the LSD value in the control/status register 116, or both. It is noted that the lock-step delay is normally disabled, such as setting LSD to zero for no delay or by disabling or bypassing the delay circuitry 110, to properly handle the case in which CORE2 is determined to be the only working processing core. If operation is continued in split-lock mode using only CORE2, then any delay of CORE2 accessing the memory 104 to execute the APP instructions is not beneficial.

At next block 320 after entering the repair state, the lock-step monitor 112 directs both of the processing cores 102 to execute the TEST instructions from the memory 104. In various embodiments, the lock-step monitor 112 may retrieve the TI start address from the register 118 and pass to CORE1 and CORE2 for executing the TEST instructions, or the lock-step monitor 112 simply directs both of the processing cores 102 to perform testing using the TEST instructions in which both CORE1 and CORE2 retrieve the TI start address directly from the register 118. While executing the TEST instructions, CORE1 updates the C1TR value and CORE2 updates the C2TR value in the control/status register 116. Although successful status can only be determined after completion of tests, failure can be determined immediately after a failure has been reported while executing the tests so that faster recovery action can be taken. Meanwhile, the lock-step monitor 112 monitors the C1TR and C2TR values in the control/status register 116 to determine whether at least one core failure has been indicated. Block 322 represents the lock-step monitor 112 determining whether one of the processing cores 102 has failed. Such determination may be made after the test procedure has concluded for both of the processor cores 102, or may be expedited by the lock-step monitor 112 when either C1TR or C2TR indicates that the corresponding processing core has failed.

It is noted that it is possible, albeit very unlikely, that both of the processing cores 102 fail the testing procedure. Such a scenario is beyond the scope of the present disclosure, but generally involves the SYSTEM 120 detecting the dual failure and taking the appropriate remedial action like the conventional method to enter fail-safe state.

In the more likely event that only one of the processor cores 102 has failed as determined at block 322, operation advances to block 324 in which the lock-step monitor 112 disables the repair state, reconfigures the processing system 100 into a split-lock mode using only one of the processing cores 102, halts operation of the faulty core, and restarts the working one of the processing cores 102 to begin accessing and executing the APP instructions from the memory 104. The lock-step monitor 112 may further notify the SYSTEM 120 of the reconfigured mode of the processing system 100 operating in split-lock mode. In certain safety configurations, the user may be informed that the application is operating in a compromised or somewhat downgraded state since one of the processing cores 102 is faulty and no longer working properly so that core redundancy is lost.

It may be possible, though unlikely, that both of the processing cores 102 have passed testing so that both are working properly in spite of one or more lock-step errors. In that case operation may advance instead to block 326 in which the repair state is disabled, the registers 114 are reset or otherwise reconfigured, the comparator 108 is re-enabled, the lock-step delay is reset to its original or default value, lock-step operation is re-initialized and the APP instructions are restarted on both of the processing cores 102. In addition, the SYSTEM 120 may be notified of the fact that one or more lock-step errors have been detected and that both of the processing cores 102 have performed the testing procedure by executing the TEST instructions and have passed testing. In this case, operation may loop back to block 304 for continued lock-step operation.

The system and method of dynamic hardware reconfiguration during failure of a device in a lock-step configuration to improve availability of the system has been illustrated with processing cores, but is equally applicable to direct memory access (DMA) engines or bus systems or any other lock-step configurations. Generally, a hardware lock-step monitor compares a count of lock-step errors from a comparator with a lock-step threshold which enables any number of lock-step errors to be ignored before taking corrective action. When the lock-step threshold is reached, a repair state may be entered to determine which of the devices is faulty and which is operating correctly, and then operation may be reconfigured into a split-lock mode to resume operation using the correctly operating device. A correction select value may be programmed to first reset the lock-step configuration including both of the devices and the comparator in hardware before entering the repair mode. The system and method is performed in hardware so that software intervention that would otherwise force a system reset to perform time-consuming diagnostic operations with sluggish handshake communications is avoided.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive circuitry or negative circuitry may be used in various embodiments in which the present invention is not limited to specific circuitry polarities, device types or voltage or error levels or the like. For example, circuitry states, such as circuitry low and circuitry high may be reversed depending upon whether the pin or signal is implemented in positive or negative circuitry or the like. In some cases, the circuitry state may be programmable in which the circuitry state may be reversed for a given circuitry function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

We claim:

1. A hardware reconfiguration system for first and second devices in a lock-step configuration using a comparator that provides a lock-step error indication, comprising:

at least one register that stores a lock-step threshold, a correction select value, and a reset performed value; and a lock-step monitor that is configured to compare a count of occurrences of the lock-step error indication from the comparator with the lock-step threshold, and when the lock-step threshold is reached, to enter a repair state to determine which one of the first and second devices is operating correctly and to reconfigure operation into a split-lock mode to resume operation using the one of the first and second devices that is operating correctly, wherein the lock-step monitor is further configured, when the lock-step threshold is reached, to:

reset the first and second devices and the comparator when the correction select value indicates reset and the reset performed value indicates a reset has not been performed, or enter the repair state when the correction select value indicates repair or after receiving another lock-step error indication after a reset has been performed.

2. The hardware reconfiguration system of claim 1, wherein during the repair state the lock-step monitor is configured to disable the comparator, to initiate independent testing of the first and second devices, and to reconfigure operation in the split-lock mode to resume operation using one of the first and second devices that has passed the testing.

3. The hardware reconfiguration system of claim 1, wherein the lock-step monitor is further configured to provide a notification of reconfigured mode after resuming operation in the split-lock mode.

4. The hardware reconfiguration system of claim 1, wherein the first and second devices comprise first and second processing cores, further comprising:

a memory that stores application instructions for execution by the first and second processing cores during the lock-step configuration, wherein the memory further stores test instructions;

wherein at least one register further stores a starting address of the test instructions; and wherein the lock-step monitor is further configured to direct the first and second processing cores to execute the test instructions located at the starting address when in the repair state to determine which one of the first and second processing cores is operating correctly.

5. The hardware reconfiguration system of claim 4, wherein the at least one register further stores a first test result value for the first processing core and a second test result value for the second processing core, wherein the first processing core updates the first test result value during the testing, wherein the second processing core updates the second test result value during the testing, and wherein the lock-step monitor is further configured to consult the first and second test result values stored in at least one register to identify results of the testing.

6. The hardware reconfiguration system of claim 4, wherein the lock-step monitor is further configured to resume operation in a split-lock mode by causing the correctly operating processing core that has passed the testing to begin executing the application instructions.

7. The hardware reconfiguration system of claim 6, wherein the lock-step monitor is further configured to provide a notification of reconfigured operation in the split-lock mode.

8. A processing system, comprising:

a memory that stores application instructions;

at least one register that stores a lock-step threshold, a correction select value, and a reset performed value;

first and second processors configured to execute the application instructions in a lock-step configuration;

a comparator that compares processing results of the first and second processors and that provides a lock-step error indication; and a lock-step monitor that is configured to compare a count of occurrences of the lock-step error indication from the comparator with the lock-step threshold, and when the lock-step threshold is reached, to enter a repair state to determine which one of the first and second processors is operating correctly and to reconfigure operation into a split-lock mode to resume operation using the one of the first and second processors that is operating correctly, wherein the lock-step monitor is further configured, when the lock-step threshold is reached, to:

reset the first and second processors and the comparator when the correction select value indicates reset and the reset performed value indicates a reset has not been performed, or enter the repair state when the correction select value indicates repair or after receiving another lock-step error indication after a reset has been performed.

9. The processing system of claim 8, wherein during the repair state the lock-step monitor is configured to disable the comparator, to initiate independent testing of the first and second processors, and to reconfigure operation in the split-lock mode to resume operation using one of the first and second processors that has passed the testing.

10. The processing system of claim 8, wherein:

wherein the memory further stores test instructions;

wherein at least one register further stores a starting address of the test instructions; and wherein the lock-step monitor is further configured to direct the first and second processors to execute the test instructions located at the starting address when in the repair state to determine which one of the first and second processors is operating correctly.

11. The processing system of claim 8, wherein the at least one register further stores a first test result value for the first processor and a second result value for the second processor, wherein the first processor updates the first test result value during the testing, wherein the second processor updates the second test result value during the testing, and wherein the lock-step monitor is further configured to consult the first and second test result values stored in at least one register to identify results of the testing.

12. The processing system of claim 8, wherein the lock-step monitor is further configured to resume operation in a split-lock mode by causing the correctly operating processor that has passed the testing to begin executing the application instructions.

13. The processing system of claim 12, wherein the lock-step monitor is further configured to provide a notification of reconfigured operation in the split-lock mode.

14. A method of dynamic hardware reconfiguration, comprising:

operating first and second devices in a lock-step configuration using a comparator that provides a lock-step error indication;

counting occurrences of the lock-step error indication from the comparator and providing a count value;

comparing the count value with a lock-step threshold;

when the count value reaches the lock-step threshold, entering a hardware repair state for determining which one of the first and second devices is operating correctly and reconfiguring operation into a split-lock mode to resume operation using the one of the first and second devices that is operating correctly;

resetting the first and second devices and the comparator when the count value reaches the lock-step threshold, a correction select value indicates reset, and a reset performed value indicates that a reset has not been performed; and entering the hardware repair state when the count value reaches the lock-step threshold and the correction select value indicates repair or after receiving another lock-step error indication after a reset has been performed.

15. The method of claim 14, after entering the hardware repair state, further comprising:

disabling the comparator;

initiating hardware testing of the first and second devices; and reconfiguring operation into the split-lock mode wherein the first and second devices operate independently to identify a fault.

16. The method of claim 14, further comprising providing a notification of a reconfigured mode after resuming operation in the split-lock mode.

17. The method of claim 14, wherein:

the determining which one of the first and second devices is operating correctly comprises testing by redirecting the first and second devices to execute test instructions from a memory using a starting address retrieved from a register and identifying one of the devices that fails the testing; and the reconfiguring operation into the split-lock mode comprises halting a device that failed the testing and redirecting the device that passed the testing to execute application code from the memory.

* * * * *